(12) United States Patent
Miyahara

(10) Patent No.: US 12,172,843 B2
(45) Date of Patent: Dec. 24, 2024

(54) TRANSPORT CONVEYOR

(71) Applicant: Daifuku Co., Ltd., Osaka (JP)

(72) Inventor: Akira Miyahara, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/636,709

(22) PCT Filed: Apr. 6, 2020

(86) PCT No.: PCT/JP2020/015533
§ 371 (c)(1),
(2) Date: Feb. 18, 2022

(87) PCT Pub. No.: WO2021/033361
PCT Pub. Date: Feb. 25, 2021

(65) Prior Publication Data
US 2022/0289489 A1   Sep. 15, 2022

(30) Foreign Application Priority Data
Aug. 20, 2019 (JP) .................. 2019-150444

(51) Int. Cl.
*B65G 21/14* (2006.01)
*A62C 2/18* (2006.01)
*B65G 13/11* (2006.01)
*B65G 41/00* (2006.01)
*B65G 47/52* (2006.01)

(52) U.S. Cl.
CPC .............. *B65G 21/14* (2013.01); *A62C 2/18* (2013.01); *B65G 41/002* (2013.01); *B65G 47/52* (2013.01); *B65G 13/11* (2013.01)

(58) Field of Classification Search
CPC ...... B65G 21/14; B65G 41/002; B65G 47/52; B65G 13/11; B65G 47/66; B65G 2207/04; B65G 13/12; B65G 2207/22; B65G 2812/99; A62C 2/18; A62C 2/22
See application file for complete search history.

(56) References Cited

U.S. PATENT DOCUMENTS 4,753,337 A * 6/1988 Grosjean .................. F27B 9/38
                                                                198/950
2019/0062064 A1 * 2/2019 Ogawa ..................... A62C 3/14

FOREIGN PATENT DOCUMENTS

| JP | 2001233427 A | * | 8/2001 |
| JP | 2005145704 A | * | 6/2005 |
| JP | 2005263360 A | * | 9/2005 |
| JP | 2007254085 A | * | 10/2007 |

(Continued)

*Primary Examiner* — Gene O Crawford
*Assistant Examiner* — Abby A Jorgensen
(74) *Attorney, Agent, or Firm* — The Webb Law Firm

(57) ABSTRACT

A transport conveyor includes an upstream conveyor section, a downstream conveyor section, and a relay conveyor section having an orientation changeable between a connecting orientation, in which the relay conveyor section in a gap region to connect the upstream conveyor section to the downstream conveyor section, and an open orientation, in which the relay conveyor section is in a non-overlapping region that does not overlap a movement path to open the gap region. A support axis is above a drive axis, and a link mechanism is configured such that when the relay conveyor section is in the connecting orientation, a first pivot axis is below a reference virtual plane connecting the drive axis to a second pivot axis.

14 Claims, 4 Drawing Sheets

(56) References Cited

FOREIGN PATENT DOCUMENTS

| | | | | |
|---|---|---|---|---|
| JP | 2012121681 | A | * | 6/2012 |
| JP | 2015147660 | A | * | 8/2015 |
| JP | 2016088649 | A | * | 5/2016 |
| JP | 6319046 | B2 | | 4/2018 |
| JP | 2020019576 | A | * | 2/2020 |

* cited by examiner

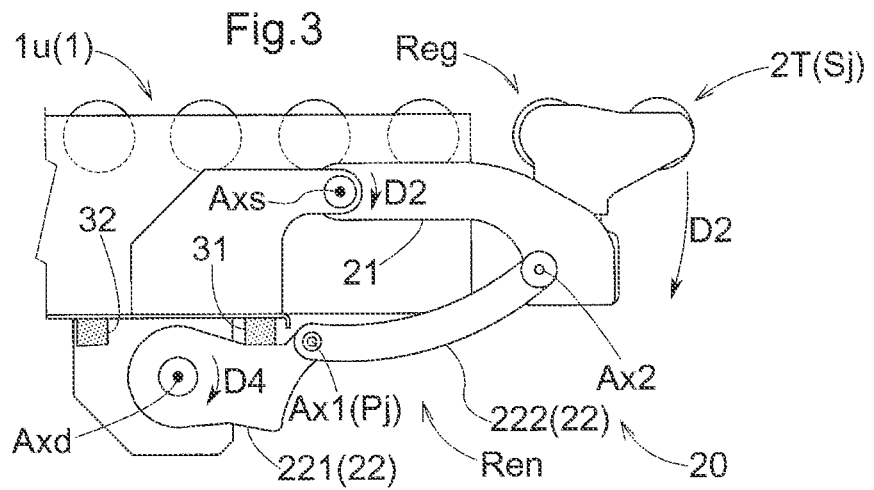
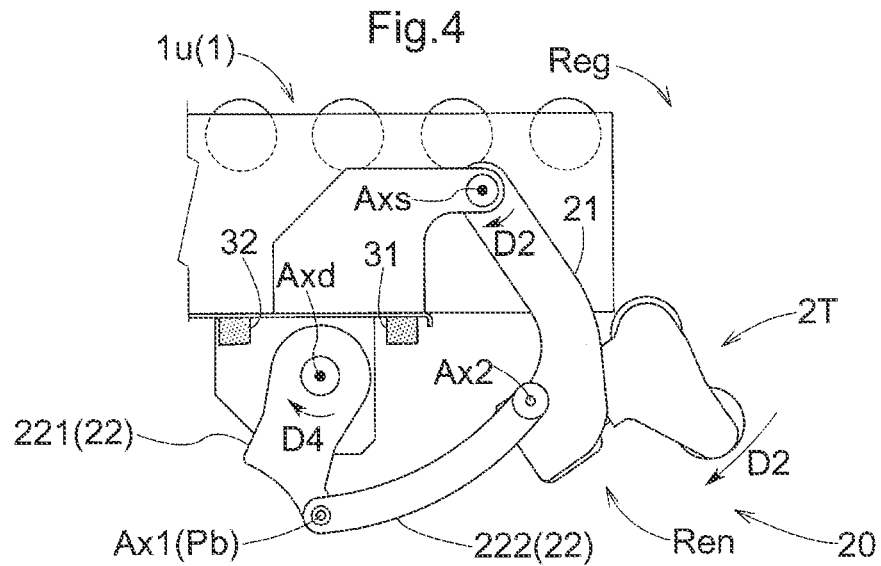
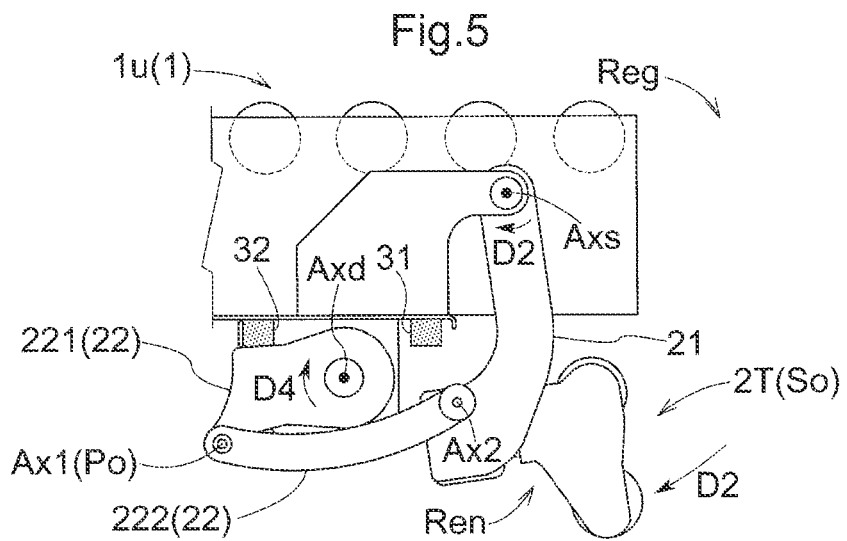

TRANSPORT CONVEYOR

CROSS-REFERENCE TO RELATED APPLICATIONS

This application is the United States national phase of International Application No. PCT/JP2020/015533 filed Apr. 6, 2020, and claims priority to Japanese Patent Application No. 2019-150444 filed Aug. 20, 2019, the disclosures of which are hereby incorporated by reference in their entirety.

BACKGROUND OF THE INVENTION

Field of the Invention

The present invention relates to a transport conveyor for transporting articles along a transport path intersecting a movement path of a fire door that is movable in the up-down direction.

Description of Related Art

An example of the aforementioned transport conveyor is disclosed in JP 6319046B (Patent Document 1). In the following, reference numerals in parentheses in the description of the background art are those used in Patent Document 1.

In the technique described in Patent Document 1, a movement path of a fire door (7) is set in the up-down direction between a first roller conveyor (11) and a second roller conveyor (21). A bridge roller (34) is provided between the first roller conveyor (11) and the second roller conveyor (21) to connect these conveyers when an article (5) is transported. In the event of a fire, the bridge roller (34) withdraws from the position between the first roller conveyor (11) and the second roller conveyor (21) under its own weight to open the movement path of the fire door (7). Thereafter, the fire door (7) moves downward along the opened movement path, is then positioned between the first roller conveyor (11) and the second roller conveyor (21), and shuts off the spaces in which the respective conveyors (11, 21) are disposed.

In the technique described in Patent Document 1, the position of the bridge roller (34) supported by leading ends of arms (32, 33) is changed by pivoting the arms (32, 33) about a center axis (38) using energy that is the driving force of a motor roller (31). That is, the bridge roller (34) is normally kept in a connecting orientation in which the bridge roller (34) connects the conveyors by using the driving force of the motor roller (31). In the event of a fire, the bridge roller (34) moves downward under its own weight as a result of the driving force of the motor roller (31) being cut off, and opens the movement path of the fire door (7).

PATENT DOCUMENTS

Patent Document 1: JP 6319046B

The technique described in Patent Document 1 adopts a configuration in which the bridge roller (34) is supported by the arms (32, 33). This configuration makes a load that is applied when an article (5) moves over the bridge roller (34) likely to act as a moment that pivots the arms (32, 33) downward. The torque borne by the motor roller (31) thus tends to be large in order to keep the bridge roller (34) in the connecting orientation. For this reason, the bridge roller (34) may be unable to maintain its orientation and move downward when a heavy article (5) is transported, thus making it difficult to appropriately maintain the connection between the conveyors. Meanwhile, if, for example, a structure capable of firmly maintaining the connection between the conveyors is adopted, it is difficult to cause the bridge roller (34) to pivot downward under its own weight when the driving force of the motor roller (31) is cut off in the event of a fire, and there may be cases where the movement path of the fire door (7) cannot be appropriately maintained in the event of a fire.

SUMMARY OF THE INVENTION

In view of the foregoing situation, it is desirable to realize a technique that makes it possible to appropriately maintain the connection between the conveyors and appropriately secure the movement path of a fire door in the event of a fire.

A transport conveyor according to the present disclosure is a transport conveyor for transporting an article along a transport path intersecting a movement path of a fire door movable in an up-down direction, the transport conveyor including:

an upstream conveyor section;

a downstream conveyor section disposed downstream of the upstream conveyor along the transport path with a gap region in a region of the transport path that overlaps the movement path, between the downstream conveyor section and the upstream conveyor section;

a relay conveyor section having an orientation changeable between (i) a connecting orientation, in which the relay conveyor section is in the gap region to connect the upstream conveyor section to the downstream conveyor section, and (ii) an open orientation, in which the relay conveyor section is in a non-overlapping region, which does not overlap the movement path, to open the gap region; and an orientation change mechanism configured to change the orientation of the relay conveyor section, wherein the orientation change mechanism includes: a support member supporting the relay conveyor section such that the relay conveyor section is pivotable between the connecting orientation and the open orientation; a link mechanism joined to the support member; and a drive unit configured to drive the link mechanism, the support member is supported in such a manner as to be pivotable about a support axis whose position relative to the gap region is fixed, and is joined to the relay conveyor section at a support joint section separated from the support axis, the link mechanism includes a first link member and a second link member, the first link member is supported in such a manner as to be pivotable about a drive axis whose position relative to the gap region is fixed, and is joined to the second link member in such a manner as to be pivotable relative to the second link member about a first pivot axis at a first joint section separated from the drive axis, the second link member is joined to the support member in such a manner as to be pivotable relative to the first link member about a second pivot axis at a second joint section separated from the first pivot axis, the drive unit is configured to (i) generate a driving force to pivot the first link member about the drive axis in a direction in which the relay conveyor section is in the connecting orientation, in response to receiving energy, and (ii) cease to generate the driving force in response to the energy being cut off, the support axis, the drive axis, the first pivot axis, and the second pivot axis are parallel to one another, the support axis is above the drive axis, and the link mechanism is configured such that when the relay conveyor section is in the connecting orientation, the first pivot axis is below a reference virtual plane connecting the drive axis to the second pivot axis.

According to this configuration, the load applied to the relay conveyor section when an article is transported can be partially supported by the link mechanism, thus making it possible to reduce the driving force of the drive unit required to maintain the connecting orientation of the relay conveyor section. It is, therefore, possible to appropriately maintain the connection between the upstream conveyor section and the downstream conveyor section while reducing the burden on the drive unit. Further, according to this configuration, the support axis is located above the drive axis, and the first pivot axis is located below the reference virtual plane connecting the drive axis to the second pivot axis when the relay conveyor section is in the connecting orientation. Therefore, if the supply of energy to the drive unit is cut off, the relay conveyor section supported by the support member pivots downward about the support axis center under its own weight, and the first pivot axis moves downward, thus allowing the link mechanism to operate such that the first link member and the second link member are folded into a V-shape. Accordingly, according to this configuration, the relay conveyor section can be appropriately set to the open orientation without the link mechanism interrupting the pivoting of the relay conveyor section under its own weight. This configuration makes it possible to also open the gap region and appropriately secure the movement path of the fire door when the supply of energy to the drive unit is cut off in the event of a fire.

Further features and advantages of the technique according to the present disclosure will become more apparent in the description of the following exemplary and non-limiting embodiment that will be described with reference to the drawings.

BRIEF DESCRIPTION OF THE DRAWINGS

FIG. 3 is an operation diagram of a relay conveyor section and shows a first pivot axis located at a connecting orientation position.

FIG. 4 is an operation diagram of the relay conveyor section and shows the first pivot axis located at the lowermost position.

FIG. 5 is an operation diagram of the relay conveyor section and shows the first pivot axis located at an open orientation position.

DESCRIPTION OF THE INVENTION

A transport conveyor is an apparatus that transports articles along a preset transport path, and is used in an article transport facility for transporting articles, for example. There are cases where the transport conveyor extends through a plurality of fireproof zones in a facility where the article transport facility is installed. In this case, the transport conveyor is provided intersecting movement paths of fire doors. Hereinafter, a transport conveyor according to the present embodiment will be described while taking an example where the transport conveyor is applied to an article transport facility such as that described above.

Schematic Configuration of Article Transport Facility

Figure 1:
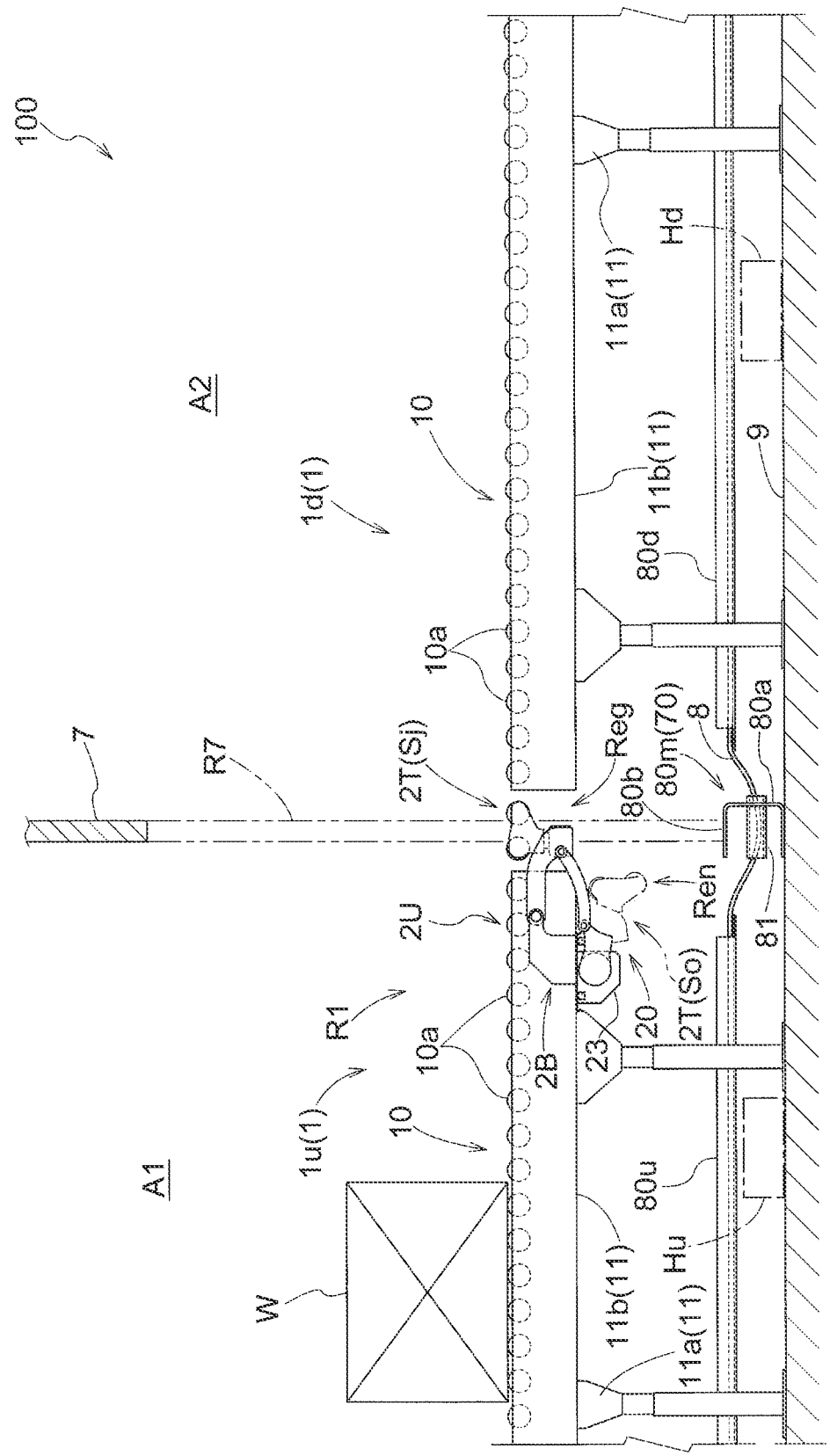
FIG. 1 is a side view of an article transport facility equipped with a transport conveyor.

An article transport facility 100 includes a transport conveyor 1 for transporting an article W, and a fire door 7 for shutting off a first area A1 from a second area A2 in the event of a fire, as shown in FIG. 1. The fire door 7 is capable of shutting off the first area A1 from the second area A2 by moving along a movement path R7 that is set in the up-down direction. The transport conveyor 1 transports the article W along a transport path R1 that intersects the movement path R7 of the fire door 7, which is movable in the up-down direction. In the following description, the upstream side and the downstream side are defined based on the direction in which the article W is transported that is parallel to the transport path R1.

The transport conveyor 1 includes an upstream conveyor section 1u, a downstream conveyor section 1d, and a relay conveyor section 2T.

The upstream conveyor section 1u is disposed upstream of the fire door 7 along the transport path R1. The downstream conveyor section 1d is disposed downstream of the upstream conveyor section 1u along the transport path R1, with a gap region Reg, which is set in a region of the transport path R1 that overlaps the movement path R7, between the downstream and upstream conveyor sections 1d and 1u. In other words, the downstream conveyor section 1d is disposed downstream of the fire door 7 along the transport path R1. In this example, the upstream conveyor section 1u is disposed in the first area A1, and the downstream conveyor section 1d is disposed in the second area A2. The orientation of the relay conveyor section 2T changes between a connecting orientation Sj, in which the relay conveyor section 2T is disposed in the gap region Reg to connect the upstream conveyor section 1u to the downstream conveyor section 1d, and an open orientation So, in which the relay conveyor section 2T is disposed in a non-overlapping region Ren that does not overlap the movement path R7 to open the gap region Reg.

In the present embodiment, the movement path R7 of the fire door 7 is set in the up-down direction between the upstream conveyor section 1u and the downstream conveyor section 1d, and partially overlaps the gap region Reg. When the relay conveyor section 2T is in the connecting orientation Sj, movement of the fire door 7 along the movement path R7 is interrupted by the relay conveyor section 2T. On the other hand, when the relay conveyor section 2T is in the open orientation So, the gap region Reg is opened and the movement of the fire door 7 along the movement path R7 is therefore not interrupted.

When the article W is transported in the article transport facility 100, the relay conveyor section 2T takes the connecting orientation Sj to connect the upstream conveyor section 1u to the downstream conveyor section 1d, and the article W is transported along the transport path R1. In the event of a fire, the relay conveyor section 2T takes the open orientation So to open the movement path R7 of the fire door 7. The fire door 7 then descends along the movement path R7 to be disposed in a space including the gap region Reg between the upstream conveyor section 1u and the downstream conveyor section 1d, and shuts off the first area A1 from the second area A2.

Upstream Conveyor Section and Downstream Conveyor Section

The upstream conveyor section 1u and the downstream conveyor section 1d are separated from each other along the transport path R1. The aforementioned gap region Reg is thus formed between the upstream conveyor section 1u and the downstream conveyor section 1d.

In the present embodiment, the upstream conveyor section 1u and the downstream conveyor section 1d have the same structure. The upstream conveyor section 1u and the downstream conveyor section 1d each include a transport unit 10 that transports the article W and a support portion 11 that supports the transport unit 10.

In the present embodiment, the transport unit 10 includes a plurality of rollers 10a disposed along the transport path R1. That is, the upstream conveyor section 1u and the downstream conveyor section 1d are roller conveyors. However, not limited to this configuration, at least either the upstream conveyor section 1u or the downstream conveyor section 1d may alternatively be a belt conveyor, a chain conveyor, or any other known conveyor.

The support portion 11 includes a column 11a fixed to a floor surface 9, and side frames 11b that are joined to an upper part of the column 11a and support the transport unit 10 from both sides in the width direction of the transport path R1. The transport unit 10 is thus supported at a position separated upward from the floor surface 9, and a space is formed below the transport unit 10.

In the present embodiment, the transport conveyor 1 includes an upstream controller Hu that at least controls the upstream conveyor section 1u, and a downstream controller Hd that at least controls the downstream conveyor section 1d. Each controller (Hu, Hd) includes a processor such as a microcomputer, peripheral circuits such as a memory, and so on, for example. Each function is realized by cooperation between these pieces of hardware and programs executed by the processor.

In the present embodiment, the upstream controller Hu and the downstream controller Hd are disposed in the space below the transport unit 10. In the shown example, the upstream controller Hu is disposed upstream of the fire door 7, i.e., in the first area A1. The downstream controller Hd is disposed downstream of the fire door 7, i.e., in the second area A2.

A cable unit 8 is disposed below the transport unit 10. The cable unit 8 includes a signal line connected to the controllers (Hu, Hd), a power supply line for supplying power for driving each part of the facility, e.g., power for driving the upstream conveyor section 1u and the downstream conveyor section 1d, and so on. The cable unit 8 extends through the first area A1 and the second area A2. The cable unit 8 is covered and protected by an upstream protection member 80u in the first area A1, and is covered and protected by a downstream protection member 80d in the second area A2.

In the present embodiment, the cable unit 8 is protected by an intermediate protection member 80m in a region corresponding to the movement path R7 of the fire door 7, i.e., a region between the first area A1 and the second area A2. The intermediate protection member 80m includes a side face 80a extending upward from the floor surface 9, and an upper face 80b connected to the side face 80a and facing upward. In this example, the intermediate protection member 80m is formed using a piece of grooved steel. The cable unit 8 is disposed below the upper face 80b while being covered by a sleeve 81, and extends through the side face 80a. The cable unit 8 thus extends through the first area A1 and the second area A2. Note that the inside of the sleeve 81 is favorably filled with a fireproof material.

Fire door

The fire door 7 is a barrier that shuts off the first area A1 from the second area A2 in the event of a fire, and is a fire shutter, for example. The fire door 7 is disposed above the transport conveyor 1 when the article W is transported so as not to interfere with the transport of the article W. When, for example, the article W is being transported, the fire door 7 is held above the transport conveyor 1 by a holding mechanism (not shown) that operates in response to receiving the supply of energy, such as electric power. When energy is cut off due to a fire, the holding mechanism releases the fire door 7, which then descends under its own weight.

The fire door 7 descends along the movement path R7 in the event of a fire, and is disposed in the space including the gap region Reg between the upstream conveyor section 1u and the downstream conveyor section 1d, as mentioned above. In the present embodiment, the fire door 7 descends to a position at which the fire door 7 comes into contact with the intermediate protection member 80m. That is, in this example, the intermediate protection member 80m functions as a door receiver 70 that receives, from below, the fire door 7 that has descended. In the shown example, the fire door 7 comes into contact with the upper face 80b of the intermediate protection member 80m from above. This configuration makes it possible to favorably shut off the first area A1 from the second area A2 with the cable unit 8 disposed extending through the first area A1 and the second area A2.

As described above, in the article transport facility 100, the upstream conveyor section 1u and the downstream conveyor section 1d are connected by the relay conveyor section 2T when the article W is being transported. The upstream conveyor section 1u and the downstream conveyor section 1d are disconnected to open the movement path R7 of the fire door 7 in the event of a fire. That is, the relay conveyor section 2T disposed between the upstream conveyor section 1u and the downstream conveyor section 1d can move freely, thereby enabling change between the state where the upstream conveyor section 1u and the downstream conveyor section 1d are connected and the state where the movement path R7 of the fire door 7 is open.

Here, there have been cases where, depending on the configuration of the relay conveyor section 2T, the connecting orientation Sj cannot be maintained and the relay conveyor section 2T moves downward when a heavy article is transported, making it difficult to appropriately maintain the connection between the upstream conveyor section 1u and the downstream conveyor section 1d. Meanwhile, it is preferable that the relay conveyor section 2T moves downward under its own weight to open the movement path R7 of the fire door 7 when energy is cut off in the event of a fire. However, if, for example, a structure capable of firmly maintaining the connecting orientation Sj of the relay conveyor section 2T is adopted, it is difficult to configure the relay conveyor section 2T such that it moves under its own weight when energy is cut off in the event of a fire as described above. There have therefore been cases where the movement path R7 of the fire door 7 cannot be appropriately secured in the event of a fire. The transport conveyor 1 according to the present disclosure has the relay conveyor section 2T with the following configuration, and is therefore capable of appropriately maintaining the connection between the upstream conveyor section 1u and the downstream conveyor section 1d and appropriately securing the movement path R7 of the fire door 7 in the event of a fire. A detailed description will be given below.

Relay Conveyor Section

The transport conveyor 1 includes the relay conveyor section 2T that connects the upstream conveyor section 1u to the downstream conveyor section 1d, as mentioned above. In the present embodiment, the relay conveyor section 2T is configured as a part of a relay conveyor unit 2U with a bracket 2B for attaching the relay conveyor section 2T to the upstream conveyor section 1u or the downstream conveyor section 1d. In this example, the relay conveyor section 2T is attached to the upstream conveyor section 1u via the bracket 2B. However, not limited to this example, the relay conveyor section 2T may alternatively be attached to the downstream conveyor section 1d.

Figure 2:
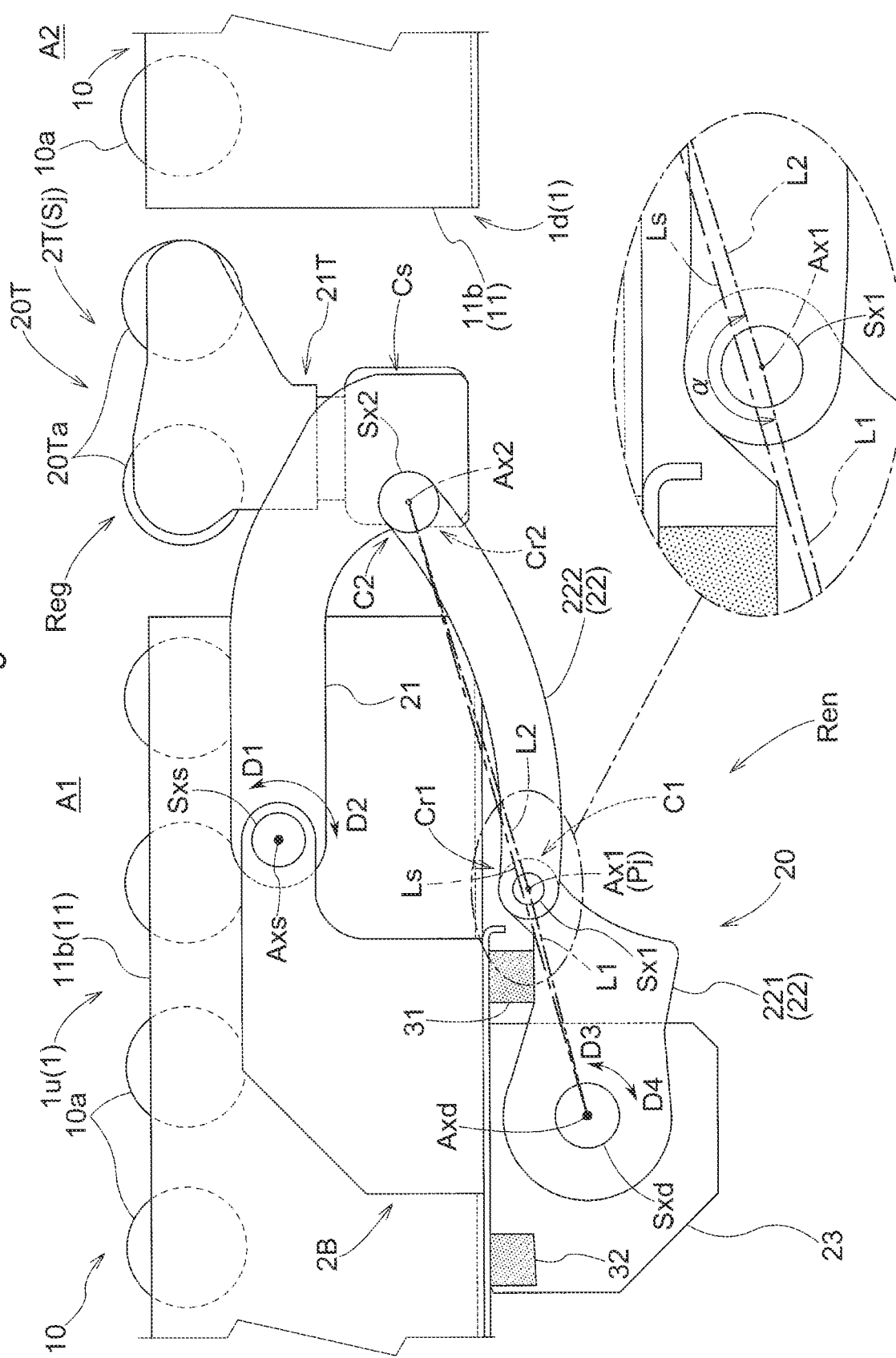
FIG. 2 is a side view of the transport conveyor in which a main part thereof is enlarged.

The relay conveyor section 2T includes a transport unit 20T that transports the article W and a support frame 21T that supports the transport unit 20T, as shown in FIG. 2. In the present embodiment, the transport unit 20T includes a plurality of rollers 20Ta. That is, the relay conveyor section 2T is a roller conveyor. One of the plurality of rollers 20Ta is a driver roller, and the others are driven rollers that follow the driver roller. However, not limited to this configuration, the relay conveyor section 2T may alternatively be a belt conveyor, a chain conveyor, or any other known conveyor.

The orientation of the relay conveyor section 2T changes between the connecting orientation Sj in which the relay conveyor section 2T is disposed in the gap region Reg to connect the upstream conveyor section 1u to the downstream conveyor section 1d, and the open orientation So (see FIG. 1) in which the relay conveyor section 2T is disposed in the non-overlapping region Ren to open the gap region Reg. The transport conveyor 1 has an orientation change mechanism 20 that changes the orientation of the relay conveyor section 2T.

The orientation change mechanism 20 includes a support member 21 that supports the relay conveyor section 2T such that the relay conveyor section 2T is capable of pivoting between the connecting orientation Sj and the open orientation So (see FIG. 1), a link mechanism 22 joined to the support member 21, and a drive unit 23 that drives the link mechanism 22, as shown in FIG. 2.

The support member 21 is supported so as to be pivotable about a support axis Axs, whose position relative to the gap region Reg is fixed, and is joined to the relay conveyor section 2T at a support joint section Cs, which is separated from the support axis Axs. In the present embodiment, the support member 21 is supported so as to be pivotable about the support axis Axs with respect to the side frames 11b of the upstream conveyor section 1u. That is, in this example, the position of the support axis Axs relative to the upstream conveyor section 1u, or more specifically, the position relative to the side frames 11b of the upstream conveyor section 1u is fixed. Note that, in the present embodiment, the support member 21 is joined to the bracket 2B via a support shaft Sxs, whose axis is the support axis Axs.

In the present embodiment, the support joint section Cs is formed at an end (hereinafter, "pivot leading end") of the support member 21 on the opposite side to the support axis Axs. Further, in the present embodiment, the support joint section Cs and the relay conveyor section 2T are joined so as not to be capable of relative rotation. In this example, the support joint section Cs is joined to the support frame 21T of the relay conveyor section 2T.

The link mechanism 22 includes a first link member 221 and a second link member 222. The first link member 221 is supported so as to be pivotable about a drive axis Axd, whose position relative to the gap region Reg is fixed, as shown in FIG. 2. The first link member 221 and the second link member 222 are joined to each other so as to be capable of relatively pivoting about a first pivot axis Ax1. The second link member 222 and the support member 21 are joined so as to be capable of relatively pivoting about a second pivot axis Ax2. The support axis Axs, the drive axis Axd, the first pivot axis Ax1, and the second pivot axis Ax2 are parallel to each other. In this example, these axes are parallel to the width direction, which is a direction orthogonal to the direction parallel to the transport path R1 in a plan view.

Although not shown in detail in the diagrams, two sets of the support member 21, the first link member 221, and the second link member 222 are provided in correspondence with the respective side frames 11b of the upstream conveyor section 1u, and are disposed on the respective sides in the width direction of the upstream conveyor section 1u.

In the following description, a pivot direction about the support axis Axs for the relay conveyor section 2T to switch from the open orientation So to the connecting orientation Sj is referred to as a first pivot direction D1, and the opposite direction is referred to as a second pivot direction D2. Note that, in FIG. 2, the first pivot direction D1 is a counterclockwise direction about the support axis Axs, and the second pivot direction D2 is a clockwise direction about the support axis Axs.

When the relay conveyor section 2T is in the connecting orientation Sj, the support member 21 extends from the position at which the support axis Axs is located toward the gap region Reg, and the pivot leading end of the support member 21 is located protruding into the gap region Reg. The relay conveyor section 2T supported by the support joint section Cs of the support member 21 is thus also disposed in the gap region Reg. In this example, the support member 21 has a curved shape protruding upward when the relay conveyor section 2T is in the connecting orientation Sj. The pivot leading end of the support member 21 is located below an end (hereinafter, "pivot base end") on the support axis Axs side of the support member 21. In this example, the support joint section Cs joined to the relay conveyor section 2T is formed at the pivot leading end (here, downstream end) of the support joint section 21.

The drive unit 23 receives the supply of energy, thereby generating the driving force to pivot the first link member 221 about the drive axis Axd in the direction in which the relay conveyor section 2T takes the connecting orientation Sj, and ceases to generate the driving force when energy is cut off. That is, the drive unit 23 causes the relay conveyor section 2T to change the orientation thereof from the open orientation So to the connecting orientation Sj, generates the driving force to maintain this connecting orientation Sj, and transmits this driving force to the support member 21 and the relay conveyor section 2T via the link mechanism 22. Meanwhile, if the drive unit 23 ceases to generate the driving force due to energy being cut off, the driving force transmitted to the support member 21 and the relay conveyor section 2T via the link mechanism 22 is lost. As a result, the relay conveyor section 2T and the support member 21 pivot under their own weight about the support axis Axs of the relay conveyor section 2T and the support member 21, and the relay conveyor section 2T takes the open orientation So. That is, the orientation of the relay conveyor section 2T changes from the connecting orientation Sj to the open orientation So under its own weight when the driving force generated by the drive unit 23 is lost due to energy being cut off. In this example, energy supplied to the drive unit 23 is cut off in the event of a fire.

In the following description, the direction in which the first link member 221 pivots about the drive axis Axd such that the orientation of the relay conveyor section 2T changes from the open orientation So to the connecting orientation Sj using the driving force of the drive unit 23 is referred to as a third pivot direction D3, and the opposite direction is referred to as a fourth pivot direction D4. Note that, in the example in FIG. 2, the third pivot direction D3 is a counterclockwise direction about the drive axis Axd and corresponds to the first pivot direction D1. The fourth pivot direction D4 is a clockwise direction about the drive axis Axd and corresponds to the second pivot direction D2.

In the present embodiment, the drive unit 23 is attached to the upstream conveyor section 1u via the bracket 2B. In the shown example, the drive unit 23 protrudes downward with respect to the side frames 11b of the upstream conveyor section 1u. The drive axis Axd is located below the upstream conveyor section 1u. In the present embodiment, the drive unit 23 is a motor roller that generates torque in response to receiving electric power as energy, or may alternatively be an electric motor. However, not limited to this configuration, the drive unit 23 may alternatively be an air cylinder or a rotary actuator that generates the driving force using air pressure serving as energy, for example.

The first link member 221 is supported so as to be pivotable about the drive axis Axd, whose position relative to the gap region Reg is fixed, and is joined to the second link member 222 so as to be relatively pivotable about the first pivot axis Ax1 at a first joint section C1 separated from the drive axis Axd. In the present embodiment, the first link member 221 is joined via a drive shaft Sxd, whose axis is the drive axis Axd, so as to integrally rotate with a rotary shaft of the drive unit 23. That is, the position of the drive axis Axd relative to the drive unit 23 and the position of the drive axis Axd relative to the side frames 11b of the upstream conveyor section 1u to which the drive unit 23 is attached are fixed in this example.

The first link member 221 is disposed extending from the position at which the drive axis Axd is located toward the gap region Reg when the relay conveyor section 2T is in the connecting orientation Sj. The second link 222 is joined to the first link member 221 so as to be relatively pivotable about the first pivot axis Ax1. In the present embodiment, the first link member 221 is joined to the second link member 222 via a first pivot shaft Sx1, whose axis is the first pivot axis Ax1. In this example, the second link member 222 includes a first joined section Cr1 that is joined to the first joint section C1 of the first link member 221. The first joint section C1 is joined to the first joined section Cr1 via the first pivot shaft Sx1 as to be relatively rotatable. Note that the first pivot axis Ax1 pivots about the drive axis Axd.

The second link member 222 is joined to the support member 21 at a second joint section C2 separated from the first pivot axis Ax1, so as to be relatively pivotable about the second pivot axis Ax2. Note that the second link member 222 may alternatively be joined to the support member 21 via another member. In the present embodiment, the second link member 222 is disposed extending from the position at which the first pivot axis Ax1 is located toward the gap region Reg when the relay conveyor section 2T is in the connecting orientation Sj. In this example, the second link member 222 has a curved shape protruding downward in a reference state where the relay conveyor section 2T is in the connecting orientation Sj. The second joint section C2 is located above the first joined section Cr1. In this example, the support member 21 includes a second joined section Cr2 that is joined to the second joint section C2 of the second link member 222. The second joint section C2 is joined to the second joined section Cr2 so as to be relatively pivotable about the second pivot axis Ax2. In the present embodiment, the second link member 222 is joined to the support member 21 via a second pivot shaft Sx2, whose axis is the second pivot axis Ax2. Note that the second pivot axis Ax2 pivots about the support axis Axs.

In the present embodiment, the first link member 221 is shorter than the second link member 222. That is, the separation distance La from the drive axis Axd to the first pivot axis Ax1 is shorter than the separation distance Lb from the first pivot axis Ax1 to the second pivot axis Ax2, as shown in FIG. 6(a). This configuration makes the diameter of the path along which the first link member 221 pivots relatively small. The space required for the link mechanism 22 to be able to pivot can thus be reduced. Further, in the present embodiment, the support member 21 is also shorter than the second link member 222. That is, the separation distance Lc from the support axis Axs to the second pivot axis Ax2 is shorter than the separation distance Lb from the first pivot axis Ax1 to the second pivot axis Ax2, as shown in FIG. 6(a). Thus, in this embodiment, the separation distance Lb from the first pivot axis Ax1 to the second pivot axis Ax2 is greater than or equal to the separation distance La from the drive axis Axd to the first pivot axis Ax1, and is greater than or equal to the separation distance Lc from the support axis Axs to the second pivot axis Ax2. Note that the first link member 221 is shorter than the support member 21 as well as the second link member 222 in this example. That is, the separation distance La from the drive axis Axd to the first pivot axis Ax1 is shorter than the separation distance Lc from the support axis Axs to the second pivot axis Ax2, as shown in FIG. 6(a). However, these relationships may be reversed. Specifically, the separation distance Lc (support member 21) from the support axis Axs to the second pivot axis Ax2 may alternatively be shorter than the separation distance La (first link member 221) from the drive axis Axd to the first pivot axis Ax1. Alternatively, the separation distance La from the drive axis Axd to the first pivot axis Ax1, the separation distance Lb from the first pivot axis Ax1 to the second pivot axis Ax2, and the separation distance Lc from the support axis Axs to the second pivot axis Ax2 may be equal.

The support axis Axs is located above the drive axis Axd, as shown in FIG. 2. The support axis Axs is located above both the first pivot axis Ax1 and the second pivot axis Ax2. The first pivot axis Ax1 and the second pivot axis Ax2 are both located above the drive axis Axd in the reference state where the relay conveyor section 2T is in the connecting orientation Sj.

The link mechanism 22 is configured such that the first pivot axis Ax1 is located below a reference virtual plane Ls connecting the drive axis Axd to the second pivot axis Ax2 when the relay conveyor section 2T is in the connecting orientation Sj. More specifically, the angle α between an upper face of a first virtual plane L1 connecting the drive axis Axd to the first pivot axis Ax1 and an upper face of a second virtual plane L2 connecting the first pivot axis Ax1 to the second pivot axis Ax2 is 170° or more and less than 180° when the relay conveyor section 2T is in the connecting orientation Sj. Note that the upper face of the first virtual plane L1, i.e., the face of the first virtual plane L1 that faces upward, is based on the reference state where the relay conveyor section 2T is in the connecting orientation Sj, as shown in FIG. 2. The same applies to the upper face of the second virtual plane L2. Note that the angle α between the upper face of the first virtual plane L1 and the upper face of the second virtual plane L2 when the relay conveyor section 2T is in the connecting orientation Sj is more preferably 175° or more and 179° or less. The angle α in this example is 178°.

The drive unit 23 pivots the relay conveyor section 2T in the first pivot direction D1 to change the orientation of the relay conveyor section 2T to the connecting orientation Sj by generating the driving force and pivoting the first link member 221 in the third pivot direction D3. When the relay conveyor section 2T is in the connecting orientation Sj, the drive unit 23 continues to generate a constant driving force to maintain the connecting orientation Sj of the relay conveyor section 2T.

The drive unit 23 ceases to generate the driving force when energy is cut off in the event of a fire. As a result, the relay conveyor section 2T and the support member 21 pivot in the second pivot direction D2 under their own weight. The relay conveyor section 2T thus takes the open orientation So (see FIG. 5). The first link member 221 pivots in the fourth pivot direction D4 when the relay conveyor section 2T and the support member 21 pivot in the second pivot direction D2 under their own weight. The first pivot axis Ax1 thus moves further downward of the reference virtual plane Ls. The second link member 222, which is joined to both the support member 21 that pivots in the second pivot direction D2 and the first link member 221 that pivots in the fourth pivot direction D4, moves downward and toward the upstream side. The first link member 221 and the second link member 222 are then folded into a V shape.

In the present embodiment, the transport conveyor 1 also includes a first restraint member 31 that comes into contact with a part of the orientation change mechanism 20 to restrain the support member 21 from pivoting in the first pivot direction D1 when the relay conveyor section 2T is in the connecting orientation Sj, and a second restraint member 32 that comes into contact with a part of the orientation change mechanism 20 to restrain the support member 21 from pivoting in the second pivot direction D2 when the relay conveyor section 2T is in the open orientation So, as shown in FIG. 2 (see FIG. 5 also).

Here, the orientation change mechanism 20 includes the support member 21, the link mechanism 22 (first link member 221, second link member 222), and the drive unit 23. The first restraint member 31 comes into contact with one of those constituent members of the orientation change mechanism 20. The second restraint member 32 also comes into contact with one of these constituent members of the orientation change mechanism 20. In the present embodiment, both the first restraint member 31 and the second restraint member 32 come into contact with the first link member 221.

In the present embodiment, the first restraint member 31 and the second restraint member 32 are attached to the upstream conveyor section 1u via the bracket 2B. The first restraint member 31 is disposed downstream of the drive axis Axd, and the second restraint member 32 is disposed upstream of the drive axis Axd. In the shown example, the first restraint member 31 and the second restraint member 32 are disposed at the same height.

Thus, in the present embodiment, the first restraint member 31 comes into contact with the first link member 221 in the third pivot direction D3 when the relay conveyor section 2T is in the connecting orientation Sj, as shown in FIGS. 2 and 3. The second restraint member 32 comes into contact with the first link member 221 in the fourth pivot direction D4 when the relay conveyor section 2T is in the open orientation So, as shown in FIG. 5. In this example, the second restraint member 32 is formed of an elastic member. This configuration makes it possible to mitigate the impact generated by the first link member 221 pivoting in the fourth pivot direction D4 coming into contact with the second restraint member 32 when the orientation of the relay conveyor section 2T changes from the connecting orientation Sj to the open orientation So under its own weight. Note that, in this example, the first restraint member 31 is also formed of the same elastic member as the second restraint member 32.

Here, FIGS. 3 to 5 are operation diagrams of the relay conveyor section 2T when the orientation thereof changes from the connecting orientation Sj to the open orientation So. FIG. 3 shows the relay conveyor section 2T in the connecting orientation Sj, and FIG. 5 shows the relay conveyor section 2T in the open orientation So. FIG. 4 shows the relay conveyor section 2T in the process of changing from the connecting orientation Sj to the open orientation So.

In the present embodiment, the pivoting range of the first link member 221 is set such that the lowermost point of the movement path of the first pivot axis Ax1 between a connecting orientation position Pj, which is the position of the first pivot axis Ax1 when the relay conveyor section 2T is in the connecting orientation Sj, and an open orientation position Po, which is the position of the first pivot axis Ax1 when the relay conveyor section 2T is in the open orientation So, is located between the connecting orientation position Pj and the open orientation position Po, as shown in FIGS. 3 to 5. This configuration makes the position of the first pivot axis Ax1 pass through the lowermost position Pb (see FIG. 4), which is the lowermost point of the movement path of the first pivot axis Ax1 when the orientation of the relay conveyor section 2T changes from the connecting orientation Sj to the open orientation So.

More specifically, the first pivot axis Ax1 descends before reaching the lowermost position Pb and ascends after reaching the lowermost position Pb from when the relay conveyor section 2T starts to pivot from the connecting orientation Sj under its own weight to when the relay conveyor section 2T takes the open orientation So, i.e., while the first pivot axis Ax1 moves from the connecting orientation position Pj to the open orientation position Po. This configuration makes it possible to use gravity to reduce the pivoting speed of the link mechanism 22, the support member 21 joined to the link mechanism 22, and the relay conveyor section 2T while the first pivot axis Ax1 ascends after reaching the lowermost position Pb. Accordingly, according to this configuration, the aforementioned pivoting speed can be reduced before the relay conveyor section 2T takes the open orientation So to mitigate the impact generated when the relay conveyor section 2T stops in the open orientation So.

Next, a description will be given of the load borne by the drive unit 23 when the article W passes through the relay conveyor section 2T while the article W is being transported.

Figure 6:
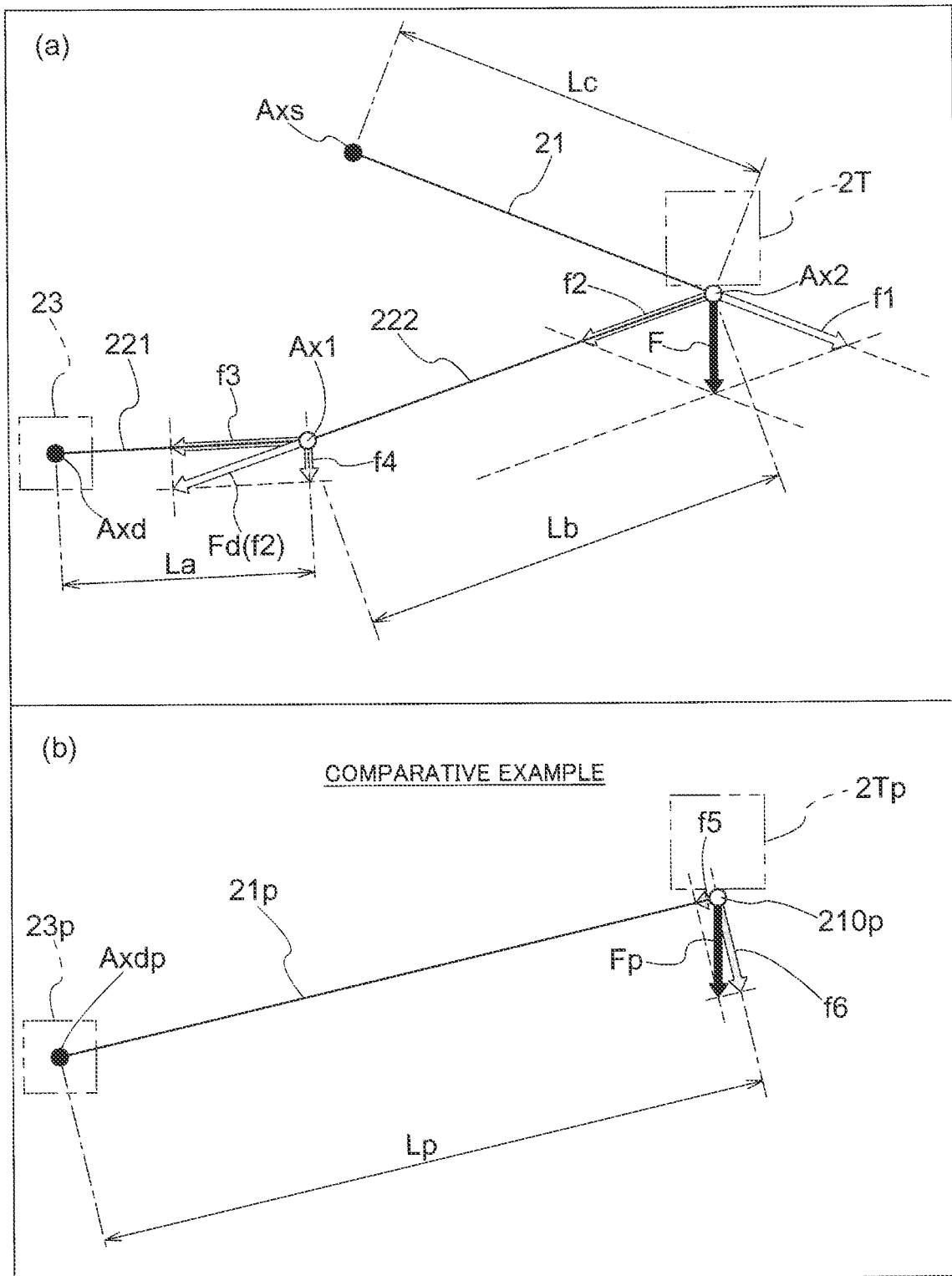
FIG. 6 is a comparative diagram of support structures for relay conveyor sections in the technique described in the present disclosure and a comparative example.

FIG. 6 is a comparative diagram in which the structure that supports the relay conveyor section connecting the conveyors is compared between the technique according to the present disclosure and a comparative example. FIG. 6(a) relates to the technique according to the present disclosure, and conceptually shows the support structure that supports the relay conveyor section 2T using the support member 21 and the link mechanism 22 through the axes (Axs, Axd, Ax1, Ax2) and the members (221, 222, 21) connecting these axes. FIG. 6(b) relates to the comparative example, and envisions, here, a support structure that supports a relay conveyor section 2Tp using one support member 21p (arm) joined to a drive unit 23p. FIG. 6(b) conceptually shows this support structure using a drive axis Axdp and the support member 21p.

First, the technique according to the present disclosure will be described. When the article W passes through the relay conveyor section 2T, a downward load F acts on the second pivot axis Ax2, as shown in FIG. 6(a). This load F can be broken down into a first component of force f1 that acts along a line connecting the support axis Axs to the second pivot axis Ax2 and a second component of force f2 that acts along a line connecting the second pivot axis Ax2 to the first pivot axis Ax1. The first component of force f1 acts as a tensile force applied to the support member 21. The second component of force f2 acts as a compressive force applied to the second link member 222. As a result, a distributed load Fd of the same magnitude and direction as the second component of force f2 acts on the first pivot axis Ax1. The distributed load Fd can be broken down into a third component of force f3 that acts along a line connecting the first pivot axis Ax1 to the drive axis Axd and a fourth component of force f4 that acts along a line orthogonal to the line connecting the first pivot axis Ax1 to the drive axis Axd. The third component of force f3 acts as a compressive force applied to the first link member 221. The fourth component of force f4 is a force acting along a tangential direction of a circle centered on the drive axis Axd at the position of the first pivot axis Ax1. Accordingly, a moment M (M=La×f4), which is calculated by multiplying the separation distance La from the drive axis Axd to the first pivot axis Ax1 by the fourth component of force f4, acts on the first link member 221. The drive unit 23 needs to output a torque equivalent to this moment M to keep the relay conveyor section 2T in the connecting orientation Sj.

Next, the comparative example will be described. The support member 21p is supported so as to be pivotable about the drive axis Axdp, and a support section 210p that supports the relay conveyor section 2Tp is provided at an end of the support member 21p on the opposite side to the drive axis Axdp, as shown in FIG. 6(b). To make a comparison with the technique according to the present disclosure, FIG. 6(b) envisions that the relationship between relative positions of the drive axis Axdp and the support section 210p is the same as the relationship between relative positions of the drive axis Axd and the second pivot axis Ax2 in FIG. 6(a).

In FIG. 6(b), when the article W passes through the relay conveyor section 2Tp, a downward load Fp acts on the support section 210p provided at the leading end of the support member 21p. This load Fp is assumed to have the same direction and magnitude as the load F that acts on the second pivot axis Ax2 in FIG. 6(a). The load Fp can be broken down into a fifth component of force f5 that acts along a line connecting the support section 210p to the drive axis Axdp and a sixth component of force f6 that acts in a direction orthogonal to the line connecting the support section 210p to the drive axis Axdp, as shown in FIG. 6(b). The fifth component of force f5 acts as a compressive force applied to the support member 21p. The sixth component of force f6 is a force acting in a tangential direction of a circle centered on the drive axis Axdp at the position of the support section 210p. Accordingly, a moment Mp (Mp=Lp×f6), which is calculated by multiplying the separation distance Lp from the drive axis Axdp to the support section 210p by the sixth component of force f6, acts on the support member 21p. In the comparative example, the drive unit 23 needs to output a torque equivalent to this moment Mp to keep the relay conveyor section 2T in the connecting orientation Sj.

As is understood by comparing FIGS. 6(a) and 6(b), the load (fourth component of force f4) borne by the drive unit 23 in the technique according to the present disclosure is smaller than the load (sixth component of force f6) borne by the drive unit 23p in the comparative example. In addition, the separation distance La from the drive axis Axd to the position at which the component of force f4 acts in the technique according to the present disclosure is shorter than the separation distance Lp from the drive axis Axdp to the position at which the component of force f6 acts in the comparative example. For this reason, the moment M that needs to be supported by the drive unit 23 in the technique according to the present disclosure is smaller than the moment Mp that needs to be supported by the drive unit 23p in the comparative example. Accordingly, the transport conveyor 1 according to the present disclosure is capable of appropriately maintaining the connection between the upstream conveyor section 1u and the downstream conveyor section 1d while reducing the burden on the drive unit 23 compared with the conventional technique.

Other Embodiments

Next, other embodiments of the transport conveyor will be described.

(1) The above embodiment has described an example where the first restraint member 31 and the second restraint member 32 come into contact with the first link member 221 of the constituent members of the orientation change mechanism 20. However, not limited to this example, the first restraint member 31 and the second restraint member 32 may alternatively come into contact with the support member 21, the second link member 222, or the drive unit 23. For example, the first restraint member 31 and the second restraint member 32 may regulate the pivoting range of the relay conveyor section 2T by coming into contact with the support member 21. If the drive unit 23 is an air cylinder or a rotary actuator, the driving stroke range is predetermined. In such a case, the first restraint member 31 and the second restrain member 32 are regarded as being built into the drive unit 23. Note that the first restraint member 31 and the second restraint member 32 may come into contact with different members. Alternatively, the first restraint member 31 and the second restraint member 32 may come into contact with a member other than the constituent members of the orientation change mechanism 20, e.g., a constituent member of the relay conveyor section 2T.

(2) The above embodiment has described an example where the pivoting range of the first link member 221 is set such that the lowermost point (lowermost position Pb) of the movement path of the first pivot axis Ax1 is located between the connecting orientation position Pj and the open orientation position Po, as shown in FIGS. 3 to 5. However, not limited to this example, the pivoting range of the first link member 221 may be set such that the lowermost position Pb of the first pivot axis Ax1 is the same as the open orientation position Po, for example.

(3) The above embodiment has described an example where the angle α between the upper face of the first virtual plane L1 and the upper face of the second virtual plane L2 is 170° or more and less than 180° when the relay conveyor section 2T is in the connecting orientation Sj. However, not limited to this configuration, the angle α may alternatively be less than 170°. For example, the angle α may be set in the range of 160° or more and less than 170°.

(4) The above embodiment has described an example where the support axis Axs is located above both the first pivot axis Ax1 and the second pivot axis Ax2. However, not limited to this example, the support axis Axs may be located below at least either the first pivot axis Ax1 or the second pivot axis Ax2 when the relay conveyor section 2T is in the connecting orientation Sj.

(5) The above embodiment has described an example where both the first pivot axis Ax1 and the second pivot axis Ax2 are located above the drive axis Axd in the reference state where the relay conveyor section 2T is in the connecting orientation Sj. However, not limited to this example, at least one of the first pivot axis Ax1 or the second pivot axis Ax2 may be located below the drive axis Axd when the relay conveyor section 2T is in the connecting orientation Sj.

(6) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made as appropriate without departing from the gist of the present disclosure.

Summary of the Above Embodiment

The above transport conveyor will be described below.

A transport conveyor for transporting an article along a transport path intersecting a movement path of a fire door movable in an up-down direction, includes:
an upstream conveyor section;
a downstream conveyor section disposed downstream of the upstream conveyor along the transport path with a gap region in a region of the transport path that overlaps the movement path, between the downstream conveyor section and the upstream conveyor section;
a relay conveyor section having an orientation changeable between (i) a connecting orientation, in which the relay conveyor section is in the gap region to connect the upstream conveyor section to the downstream conveyor section, and (ii) an open orientation, in which the relay conveyor section is in a non-overlapping region, which does not overlap the movement path, to open the gap region; and
an orientation change mechanism configured to change the orientation of the relay conveyor section,
wherein the orientation change mechanism includes: a support member supporting the relay conveyor section such that the relay conveyor section is pivotable between the connecting orientation and the open orientation; a link mechanism joined to the support member; and a drive unit configured to drive the link mechanism,
the support member is supported in such a manner as to be pivotable about a support axis whose position relative to the gap region is fixed, and is joined to the relay conveyor section at a support joint section separated from the support axis,
the link mechanism includes a first link member and a second link member,
the first link member is supported in such a manner as to be pivotable about a drive axis whose position relative to the gap region is fixed, and is joined to the second link member in such a manner as to be pivotable relative to the second link member about a first pivot axis at a first joint section separated from the drive axis,
the second link member is joined to the support member in such a manner as to be pivotable relative to the first link member about a second pivot axis at a second joint section separated from the first pivot axis,
the drive unit is configured to (i) generate a driving force to pivot the first link member about the drive axis in a direction in which the relay conveyor section is in the connecting orientation, in response to receiving energy, and (ii) cease to generate the driving force in response to the energy being cut off,
the support axis, the drive axis, the first pivot axis, and the second pivot axis are parallel to one another,
the support axis is above the drive axis, and
the link mechanism is configured such that when the relay conveyor section is in the connecting orientation, the first pivot axis is below a reference virtual plane connecting the drive axis to the second pivot axis.

According to this configuration, the load applied to the relay conveyor section when an article is transported can be partially supported by the link mechanism, thus making it possible to reduce the driving force of the drive unit required to maintain the connecting orientation of the relay conveyor section. It is, therefore, possible to appropriately maintain the connection between the upstream conveyor section and the downstream conveyor section while reducing the burden on the drive unit. Further, according to this configuration, the support axis is located above the drive axis, and the first pivot axis is located below the reference virtual plane connecting the drive axis to the second pivot axis when the relay conveyor section is in the connecting orientation. Therefore, if the supply of energy to the drive unit is cut off, the relay conveyor section supported by the support member pivots downward about the support axis center under its own weight, and the first pivot axis moves downward, thus allowing the link mechanism to operate such that the first link member and the second link member are folded into a V-shape. Accordingly, according to this configuration, the relay conveyor section can be appropriately set to the open orientation without the link mechanism interrupting the pivoting of the relay conveyor section under its own weight. This configuration makes it possible to also open the gap region and appropriately secure the movement path of the fire door when the supply of energy to the drive unit is cut off in the event of a fire.

Here, it is preferable that the transport conveyor further includes:
a first restraint member configured to come into contact with a part of the orientation change mechanism to restrain the support member from pivoting in a first pivot direction when the relay conveyor section is in the connecting orientation; and
a second restraint member configured to come into contact with a part of the orientation change mechanism to restrain the support member from pivoting in a second pivot direction when the relay conveyor section is in the open orientation,
wherein the first pivot direction is a direction in which the relay conveyor section pivots about the support axis such that the orientation of the relay conveyor section changes from the open orientation to the connecting orientation, and the second pivot direction is opposite to the first pivot direction.

According to this configuration, the pivoting range of the relay conveyor section can be restricted to the range between the connecting orientation and the open orientation. Accordingly, the relay conveyor section can be restrained from pivoting in an unintended region, e.g., protruding toward the transport path.

Here, it is preferable that the first pivot axis and the second pivot axis are separated from each other by a separation distance greater than or equal to a separation distance between the drive axis and the first pivot axis and greater than or equal to a separation distance between the support axis and the second pivot axis.

According to this configuration, both the separation distance from the drive axis to the first pivot axis and the separation distance from the support axis to the second pivot axis can be made equal to or shorter than the separation distance from the first pivot axis to the second pivot axis. Accordingly, the structure around the drive axis and the structure around the support axis can be made more compact.

It is preferable that the first link member is pivotable over a range set such that the first pivot axis is moved along a path between (i) a connecting orientation position, which is a position of the first pivot axis when the relay conveyor section is in the connecting orientation, and (ii) an open orientation position, which is a position of the first pivot axis when the relay conveyor section is in the open orientation, the path having a lowermost point between the connecting orientation position and the open orientation position.

According to this configuration, the first pivot axis descends before passing through the lowermost point and ascends after passing through the lowermost point from when the relay conveyor section starts to pivot from the connecting orientation under its own weight to when the relay conveyor section takes the open orientation, i.e., while the first pivot axis moves from the connecting orientation position to the open orientation position. Then, the pivoting speed of the link mechanism, the support member joined to the link mechanism, and the relay conveyor section can be reduced using gravity while the first pivot axis ascends. Accordingly, according to this configuration, it is possible to reduce the pivoting speed before the relay conveyor section takes the open orientation and mitigate the impact generated when the relay conveyor section stops in the open orientation.

It is preferable that a first virtual plane and a second virtual plane form an angle above that is 170° or more and less than 180° when the relay conveyor section is in the connecting orientation, the first virtual plane connecting the drive axis to the first pivot axis and the second virtual plane connecting the first pivot axis to the second pivot axis.

According to this configuration, the rotational moment that acts on the first link member from the second link member can be reduced by arranging the first link member and the second link member in a near-linear configuration. Accordingly, according to this configuration, the driving force of the drive unit required to maintain the connecting orientation of the relay conveyor section can be easily minimized.

INDUSTRIAL APPLICABILITY

The technique according to the present disclosure can be used for transport conveyors for transporting articles along a transport path intersecting a movement path of a fire door that is movable in the up-down direction.

DESCRIPTION OF REFERENCE SIGNS

1: Transport conveyor
1d: Downstream conveyor section
1u: Upstream conveyor section
2T: Relay conveyor section
20: Orientation change mechanism
21: Support member
22: Link mechanism
221: First link member
222: Second link member
23: Drive unit
7: Fire door
31: First restraint member
32: Second restraint member
Ax1: First pivot axis
Ax2: Second pivot axis
Axd: Drive axis
Axs: Support axis
C1: First joint section
C2: Second joint section
Cs: Support joint section
D1: First pivot direction
D2: Second pivot direction
L1: First virtual plane
L2: Second virtual plane
Ls: Reference virtual plane
Sj: Connecting orientation
So: Open orientation
Pj: Connecting orientation position
Po: Open orientation position
R1: Transport path
R7: Movement path
Reg: Gap region
Ren: Non-overlapping region
W: Article

The invention claimed is:

1. A transport conveyor for transporting an article along a transport path intersecting a movement path of a fire door movable in an up-down direction, the transport conveyor comprising:
   an upstream conveyor section;
   a downstream conveyor section disposed downstream of the upstream conveyor along the transport path with a gap region in a region of the transport path that overlaps the movement path, between the downstream conveyor section and the upstream conveyor section;
   a relay conveyor section having an orientation changeable between (i) a connecting orientation, in which the relay conveyor section is in the gap region to connect the upstream conveyor section to the downstream conveyor section, and (ii) an open orientation, in which the relay conveyor section is in a non-overlapping region, which does not overlap the movement path, to open the gap region; and
   an orientation change mechanism configured to change the orientation of the relay conveyor section,
   wherein:
   the orientation change mechanism comprises:
      a support member supporting the relay conveyor section such that the relay conveyor section is pivotable between the connecting orientation and the open orientation;
      a link mechanism joined to the support member; and
      a drive unit configured to drive the link mechanism,
   the support member is supported in such a manner as to be pivotable about a support axis whose position relative to the gap region is fixed, and is joined to the relay conveyor section at a support joint section separated from the support axis, the link mechanism comprises a first link member and a second link member, the first link member is supported in such a manner as to be pivotable about a drive axis whose position relative to the gap region is fixed, and is joined to the second link member in such a manner as to be rotatable relative to the second link member about a first pivot axis at a first joint section separated from the drive axis, the second link member is joined to the support member in such a manner as to be pivotable relative to the support member about a second pivot axis at a second joint section separated from the first pivot axis, the drive unit is configured to (i) generate a driving force to pivot the first link member about the drive axis in a direction in which the relay conveyor section is in the connecting orientation, in response to receiving energy, and (ii) cease to generate the driving force in response to the energy being cut off, when the supply of the energy to the drive unit is cut off, the relay conveyor section supported by the support member pivots downward about the support axis under its own weight, and the first pivot axis moves downward to allow the link mechanism to operate such that the first link member and the second link member are folded into a V-shape, the support axis, the drive axis, the first pivot axis, and the second pivot axis are parallel to one another, the support axis is above the drive axis, and the link mechanism is configured such that when the relay conveyor section is in the connecting orientation, the first pivot axis is below a reference virtual plane connecting the drive axis to the second pivot axis.

2. The transport conveyor according to claim 1, further comprising:

a first restraint member configured to come into contact with a part of the orientation change mechanism to restrain the support member from pivoting in a first pivot direction when the relay conveyor section is in the connecting orientation; and a second restraint member configured to come into contact with a part of the orientation change mechanism to restrain the support member from pivoting in a second pivot direction when the relay conveyor section is in the open orientation, wherein the first pivot direction is a direction in which the relay conveyor section pivots about the support axis such that the orientation of the relay conveyor section changes from the open orientation to the connecting orientation, and wherein the second pivot direction is opposite to the first pivot direction.

3. The transport conveyor according to claim 1, wherein the first pivot axis and the second pivot axis are separated from each other by a separation distance greater than or equal to a separation distance between the drive axis and the first pivot axis and greater than or equal to a separation distance between the support axis and the second pivot axis.

4. The transport conveyor according to claim 1, wherein the first link member is pivotable over a range set such that the first pivot axis is moved along a path between (i) a connecting orientation position, which is a position of the first pivot axis when the relay conveyor section is in the connecting orientation, and (ii) an open orientation position, which is a position of the first pivot axis when the relay conveyor section is in the open orientation, the path having a lowermost point between the connecting orientation position and the open orientation position.

5. The transport conveyor according to claim 1, wherein a first virtual plane and a second virtual plane form an angle above that is 170° or more and less than 180° when the relay conveyor section is in the connecting orientation, the first virtual plane connecting the drive axis to the first pivot axis and the second virtual plane connecting the first pivot axis to the second pivot axis.

6. The transport conveyor according to claim 2, wherein the first pivot axis and the second pivot axis are separated from each other by a separation distance greater than or equal to a separation distance between the drive axis and the first pivot axis and greater than or equal to a separation distance between the support axis and the second pivot axis.

7. The transport conveyor according to claim 2, wherein the first link member is pivotable over a range set such that the first pivot axis is moved along a path between (i) a connecting orientation position, which is a position of the first pivot axis when the relay conveyor section is in the connecting orientation, and (ii) an open orientation position, which is a position of the first pivot axis when the relay conveyor section is in the open orientation, the path having a lowermost point between the connecting orientation position and the open orientation position.

8. The transport conveyor according to claim 3, wherein the first link member is pivotable over a range set such that the first pivot axis is moved along a path between (i) a connecting orientation position, which is a position of the first pivot axis when the relay conveyor section is in the connecting orientation, and (ii) an open orientation position, which is a position of the first pivot axis when the relay conveyor section is in the open orientation, the path having a lowermost point between the connecting orientation position and the open orientation position.

9. The transport conveyor according to claim 2, wherein a first virtual plane and a second virtual plane form an angle above that is 170° or more and less than 180° when the relay conveyor section is in the connecting orientation, the first virtual plane connecting the drive axis to the first pivot axis and the second virtual plane connecting the first pivot axis to the second pivot axis.

10. The transport conveyor according to claim 3, wherein a first virtual plane and a second virtual plane form an angle above that is 170° or more and less than 180° when the relay conveyor section is in the connecting orientation, the first virtual plane connecting the drive axis to the first pivot axis and the second virtual plane connecting the first pivot axis to the second pivot axis.

11. The transport conveyor according to claim 4, wherein a first virtual plane and a second virtual plane form an angle above that is 170° or more and less than 180° when the relay conveyor section is in the connecting orientation, the first virtual plane connecting the drive axis to the first pivot axis and the second virtual plane connecting the first pivot axis to the second pivot axis.

12. The transport conveyor according to claim 1, wherein in the open orientation, the first pivot axis is on an upstream side relative to the drive axis.

13. The transport conveyor according to claim 12,
wherein in the open orientation, the second pivot axis is below the drive axis.

14. A transport conveyor for transporting an article along a transport path intersecting a movement path of a fire door movable in an up-down direction, the transport conveyor comprising:
- an upstream conveyor section;
- a downstream conveyor section disposed downstream of the upstream conveyor along the transport path with a gap region in a region of the transport path that overlaps the movement path, between the downstream conveyor section and the upstream conveyor section;
- a relay conveyor section having an orientation changeable between (i) a connecting orientation, in which the relay conveyor section is in the gap region to connect the upstream conveyor section to the downstream conveyor section, and (ii) an open orientation, in which the relay conveyor section is in a non-overlapping region, which does not overlap the movement path, to open the gap region; and
- an orientation change mechanism configured to change the orientation of the relay conveyor section, wherein:
the orientation change mechanism comprises:
- a support member supporting the relay conveyor section such that the relay conveyor section is pivotable between the connecting orientation and the open orientation;
- a link mechanism joined to the support member; and
- a drive unit configured to drive the link mechanism, the support member is supported in such a manner as to be pivotable about a support axis whose position relative to the gap region is fixed, and is joined to the relay conveyor section at a support joint section separated from the support axis, the link mechanism comprises a first link member and a second link member, the first link member is supported in such a manner as to be pivotable about a drive axis whose position relative to the gap region is fixed, and is joined to the second link member in such a manner as to be rotatable relative to the second link member about a first pivot axis at a first joint section separated from the drive axis, the second link member is joined to the support member in such a manner as to be pivotable relative to the support member about a second pivot axis at a second joint section separated from the first pivot axis, the drive unit is configured to (i) generate a driving force to pivot the first link member about the drive axis in a direction in which the relay conveyor section is in the connecting orientation, in response to receiving energy, and (ii) cease to generate the driving force in response to the energy being cut off, the support axis, the drive axis, the first pivot axis, and the second pivot axis are parallel to one another, the support axis is above the drive axis, the link mechanism is configured such that when the relay conveyor section is in the connecting orientation, the first pivot axis is below a reference virtual plane connecting the drive axis to the second pivot axis, in the open orientation, the first pivot axis is on an upstream side relative to the drive axis, and in the open orientation, the second pivot axis is below the drive axis.

* * * * *